US006966533B1

(12) United States Patent
Kalis et al.

(10) Patent No.: US 6,966,533 B1
(45) Date of Patent: Nov. 22, 2005

(54) MOUNTING APPARATUS FOR AN ELECTRONIC DEVICE

(75) Inventors: Robert M. Kalis, Overland Park, KS (US); Brian G. Schoenfish, Kansas City, KS (US); Stephen P. Robbins, Olathe, KS (US)

(73) Assignee: Garmin Ltd., (KY)

( * ) Notice: Subject to any disclaimer, the term of this patent is extended or adjusted under 35 U.S.C. 154(b) by 0 days.

(21) Appl. No.: 10/429,434

(22) Filed: May 5, 2003

(51) Int. Cl.[7] .............................................. A47G 1/10
(52) U.S. Cl. ............................ 248/316.4; 248/279.1; 379/454
(58) Field of Search .................... 248/276.1, 278.1, 248/279.1, 281.11, 316.1, 316.4; 379/446, 379/449, 454, 455; 24/523

(56) References Cited

U.S. PATENT DOCUMENTS

| | | | | |
|---|---|---|---|---|
| 1,398,483 A | * | 11/1921 | Curtis | 24/710.7 |
| 2,508,076 A | * | 5/1950 | Palmer | 33/410 |
| 2,792,932 A | * | 5/1957 | Friestat | 206/314 |
| 2,958,760 A | * | 11/1960 | McNally | 362/275 |
| 3,040,900 A | * | 6/1962 | Jones | 211/35 |
| 3,509,882 A | * | 5/1970 | Blake | 606/142 |
| 4,536,926 A | * | 8/1985 | Pantaleo | 24/523 |
| 4,583,269 A | * | 4/1986 | Harris | 24/495 |
| 4,625,526 A | * | 12/1986 | Milawski | 63/14.1 |
| 5,187,744 A | * | 2/1993 | Richter | 379/449 |
| 5,265,929 A | * | 11/1993 | Pelham | 296/97.6 |
| 5,305,381 A | * | 4/1994 | Wang et al. | 379/455 |
| 5,615,258 A | * | 3/1997 | Ho | 379/446 |
| 5,685,732 A | * | 11/1997 | Lane | 439/369 |
| 5,982,885 A | * | 11/1999 | Ho | 379/446 |
| 5,992,809 A | * | 11/1999 | Sweere et al. | 248/278.1 |
| 6,129,321 A | | 10/2000 | Minelli et al. | |
| 6,173,933 B1 | | 1/2001 | Whiteside et al. | |
| 6,366,672 B1 | * | 4/2002 | Tsay | 379/446 |
| 6,370,741 B1 | * | 4/2002 | Lu | 24/523 |
| 6,427,959 B1 | * | 8/2002 | Kalis et al. | 248/288.11 |
| 6,464,185 B1 | | 10/2002 | Whiteside et al. | |

* cited by examiner

Primary Examiner—Korie Chan
(74) Attorney, Agent, or Firm—Devon A. Rolf

(57) ABSTRACT

An apparatus for holding an electronic device is described which includes first and second brackets slidably joined together with one another and moveable to expand away from, and contract toward, one another along an operating path. The apparatus further includes first and second braces provided on the first and second brackets, respectively, and spaced apart from one another along the operating path and a biasing element biasing the first and second brackets toward one another. The first and second braces are configured to grasp an electronic device therebetween. The apparatus is part of a retaining unit also described which includes the mounting apparatus, a pivoting member, a swiveling member, and a base unit.

33 Claims, 5 Drawing Sheets

MOUNTING APPARATUS FOR AN ELECTRONIC DEVICE

BACKGROUND OF THE INVENTION

The present invention relates to a mounting apparatus for an electronic device. More specifically, embodiments of the invention relate to a mounting apparatus for an electronic device for use at a desk or in a vehicle which, among other things, allows easy access to buttons on the electronic device, allows the device to be placed in a number of positions, and allows the device to be placed within, and removed from, a mounted position with one hand.

Portable electronic devices are being used more and more frequently in vehicles. For example, personal digital assistants (PDAs) are currently used in vehicles and elsewhere. PDAs are used to receive and store information considered to be important to a user. In one known application, PDAs are utilized to store telephone numbers, notes, and addresses, which can be easily accessed and updated, if need be, by a user. Some PDAs are capable of sending and receiving electronic mail messages. Such uses have caused PDAs to become an invaluable resource for their users among other places, at work, in a vehicle, and at home.

In another example, global positioning satellite devices are currently being used in vehicles and elsewhere. These devices are used for navigational purposes and are either permanently installed in a vehicle, or mounted so as to be portable. Further, these devices have a screen which visibly communicates information to the user. The portable device is advantageous in that it can be taken from the vehicle and used outside of the vehicle, thus adding value to the device.

The mounting of PDAs, GPS devices, and other electronic devices within vehicles or at desks does, however, present a number of disadvantages. First, it is more difficult to mount a portable device in a location within the vehicle or at a desk that allows its screen to be easily viewed. Devices that are permanently installed in a vehicle can be mounted within the dashboard of the vehicle, easily within sight of the vehicle driver or passenger. Portable devices must, however, be mounted somewhere within the interior of the vehicle, such as on top of the dashboard. This mounting position presents the challenge of mounting the device in an orientation and position that can be seen and accessed.

Viewing of the screen and entry of data into a portable electronic device can be hampered if the angle of the viewing screen is fixed relative to the surface on which the device is mounted, or if the mounting device hampers access to data entry buttons on the device. Second, these electronic devices are often under-utilized if they are only viewable by the driver of the vehicle, but not passengers riding therein. In the case of the GPS device, a passenger in the vehicle is often acting as a navigator. In such situations, it is advantageous for the passenger to be able to view and/or remove the GPS or other device.

It would also be advantageous to be able to place the electronic device into a mounted position using only one hand. Similarly, it would be advantageous to remove the electronic device from a mounted position using only one hand. Therefore, a mounting apparatus is needed that can be used to mount a portable electronic device within a vehicle, at a desk or elsewhere so that the device can be easily viewed and adjusted. Further, a mounting apparatus is needed that allows an electronic device to be mounted within a vehicle so that it is viewable by either the driver or the passenger riding therein. Still further, a mounting apparatus is needed that allows an electronic device to be mounted within, utilized, and removed from, a mounted position using only one hand.

BRIEF SUMMARY OF THE INVENTION

In one embodiment of the present invention an apparatus for holding an electronic device is provided. The apparatus comprises first and second brackets slidably joined together with one another and moveable to expand away from, and contract toward, one another along an operating path. First and second braces provided on the first and second brackets, respectively, and spaced apart from one another along the operating path. A biasing element biasing the first and second brackets toward one another. The first and second braces are configured to grasp an electronic device therebetween.

In another embodiment of the present invention, a retaining unit comprising a mounting apparatus is provided that comprises a pivoting member pivotably attached to the mounting apparatus. A swiveling member is rotatably coupled to the pivoting member, and a base unit is pivotably coupled to the swiveling member. The mounting apparatus comprises first and second brackets slidably joined with one another and moveable to expand away from, and contract toward, one another along an operating path. First and second braces are provided on the first and second brackets, respectively, and spaced apart from one another along the operating path. A biasing element biasing the first and second brackets toward one another. The first and second braces are configured to grasp an electronic device therebetween.

In still another embodiment of the present invention, a holder for a portable device is provided. The holder comprises a base having a front surface defining a retention area configured to receive a device. An arm is movably attached to the base and gripping members are provided on the base and the arm. The arm moves along an axis of motion relative to the base, the axis of motion extending through the retention area. The gripping members are spaced apart from one another along the axis of motion to define borders of the retention area. The retention area has an open front face to facilitate insertion of the portable device. The gripping members are smaller than the portable device and positioned to permit edges of the portable device to be held while inserting and removing the portable device.

BRIEF DESCRIPTION OF THE DRAWINGS

The objects and features of the invention noted above are explained in more detail with reference to the drawings which form a part of the specification and which are to be read in conjunction therewith, and in which like reference numerals denote like elements in the various views. The objects and features of the invention noted above are explained in more detail with reference to the drawings, in which like reference numerals denote like elements. In the accompanying drawings which form a part of the specification and which are to be read in conjunction therewith and in which like reference numerals are used to indicate like parts in the various views.

DETAILED DESCRIPTION OF THE INVENTION

Figure 1:
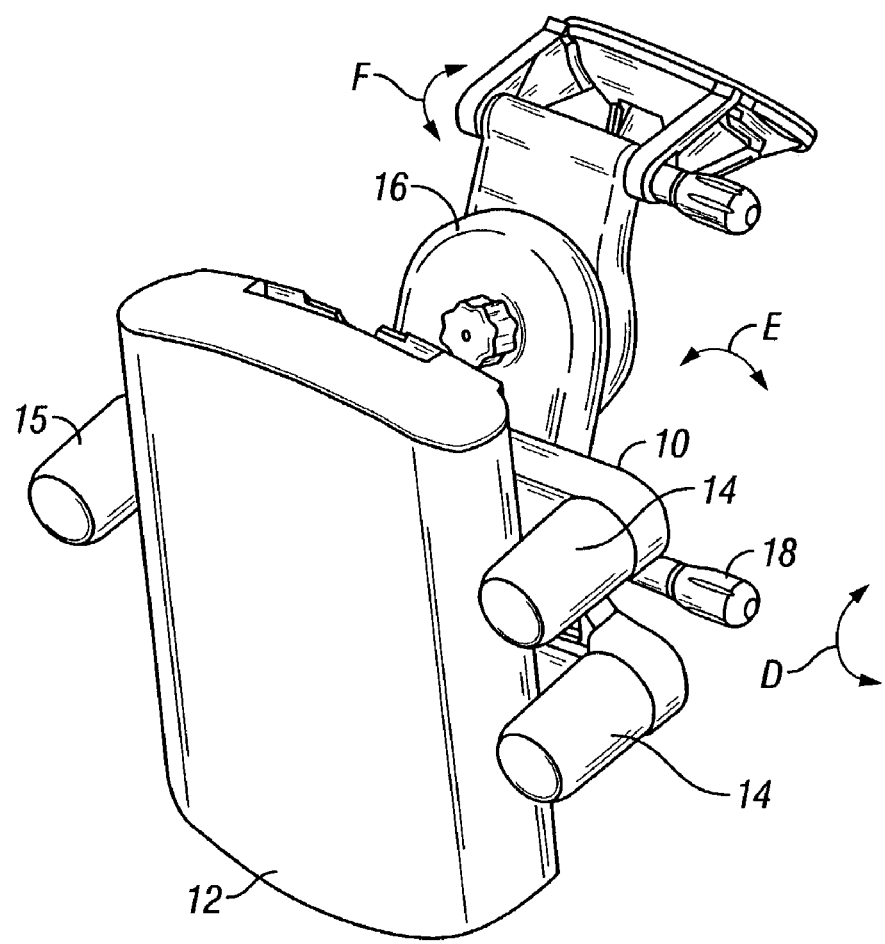
FIG. 1 is an elevation view of the mounting apparatus according to one embodiment of the present invention, including an electronic device being held by the mounting apparatus.

FIG. 1 is an elevation view of a mounting apparatus 10 according to one embodiment of the present invention. FIG. 1 further includes an electronic device 12, for example, a personal digital assistant (PDA), that is being held by mounting apparatus 10. In the embodiment shown and as further described below, mounting apparatus 10 includes two fixed supports 14 and one spring loaded moving support 15. Supports 14 and 15 are sometime referred to as braces, or gripping members. As is also further described below, mounting apparatus 10 conforms and grips a wide variety of sizes and shapes of PDAs 12, radios, global positioning system (GPS) devices, and other electronic devices. The mounting apparatus 10 may be attached to an automotive windshield, an office window or other smooth surface with a suction cup or to a dashboard, desk, or tabletop with an adhesive mounted puck or floating bean bag through attachment unit 16. Mounting apparatus 10 affords adjustment through pivoting and rotating members of attachment unit 16. The pivotal and rotational axis of attachment unit 16 are shown as axes of motion D, E, and F, which are described in detail below with respect to FIG. 9. The mounting apparatus 10 may be adjusted with respect to attachment unit 16 through actuation of lever 18. For example, actuation of lever 18 in one direction allows the mounting apparatus 10 to be rotated and/or pivoted. Actuation of lever 18 in another direction locks mounting apparatus 10 in one position.

Mounting apparatus 10 provides a large grip range and retention area without any adapters or extra parts. Optionally, supports 14 and 15 may be elastomer covered and may have different shapes. Supports 14 and 15, at least in part, allow one hand installation and removal of PDA 12, or another device.

Figure 2:
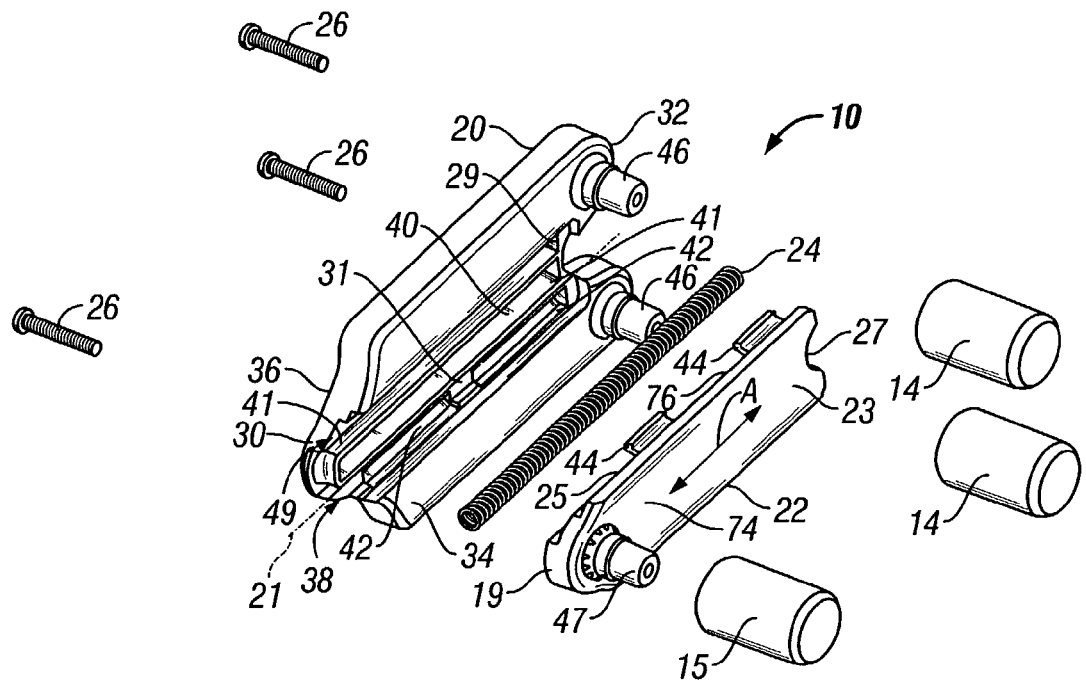
FIG. 2 is a frontal exploded view of the mounting apparatus of FIG. 1.

FIG. 2 is an exploded view of mounting apparatus 10. The mounting apparatus 10 includes a fixed bracket 20, or base, that is generally rectangular in shape and oriented to extend in the direction of axis 21. A moving bracket 22, or arm, is slidably mounted to the fixed bracket 20 and movable along path A relative to fixed bracket 20. A spring 24 is housed within and between the fixed bracket 20 and moving bracket 22. It is understood that spring 24 may be substituted with other retention devices, for example, elastic, magnets, or other mechanisms which provide biasing force to brackets 20 and 22. Spring 24 biases moving bracket 22 and fixed bracket 20 toward one another along path A. Mounting apparatus 10 further includes a plurality of fastening devices 26 which are utilized to fasten supports 14 and 15 to fixed bracket 20 and moving bracket 22. While path A is shown as a straight line, other embodiments are contemplated, for example, path A may be arc-shaped in the plane of surfaces 34 and 23. Similarly, path A may be linear or arce shaped in a plane that is different than the plane defined by surfaces 23 and 34.

More specifically, fixed bracket 20 includes a first end 30, a second end 32, a front surface 34, and a back surface 36. A channel 38 is formed in front surface 34 and oriented to extend along axis 21. Channel 38 is configured to receive and guide moving bracket 22 along path A. Moving bracket 22 rests within channel 38 such that a front surface 23 of moving bracket 22 rests flush with front surface 34 of fixed bracket 20, forming a substantially smooth surface.

The fixed bracket 20 further includes a spring insertion channel 40 formed within, and along a center of, channel 38. Spring insertion channel 40 has walls 41 running lengthwise between first end 30 and second end 32. Spring insertion channel 40 receives and retains spring 24 in a compressed state. Optionally, the fixed bracket 20 includes a plurality of slots 42 which extend through the fixed bracket 20 between the front and back surfaces 34 and 36 and run lengthwise between first end 30 and second end 32. A back surface 25 of the moving bracket 22 includes clipping members 44 extending outward from the back surface 25. Slots 42 receive and engage clipping members 44 of moving bracket 22 in a snap-fit. The clipping members 44 proximate a rear end 27 of the moving bracket 22 are pulled by the spring 24 until abutting a closed end 29 of the slots 42. The clipping members 44 proximate a middle of the moving bracket 22 may abut against an intermediate brace 31 formed in slots 42. The clipping members 44 limit a distance to which the moving member 22 is compressed or collapsed onto the fixed bracket 20.

The fixed and moving brackets 20 and 22 include posts 46 and 47 extending outward at a right angle from the front surfaces 34 and 23 respectively. Optionally, the posts 46 and 47 may be tilted at an acute or obtuse angle with respect to one another. The posts 46 are located near second end 32 and provided on opposite sides of the channel 38. The post 47 is located on the moving bracket 22 along axis 21 and aligned with channel 38 near the first end 30. The posts 46 and 47 define a retention area therebetween that is open faced and partially exposed on top, bottom and side borders. The posts 46 and 47 are arranged in a staggered pattern to evenly grip opposite sides of an electronic device. The lead end 19 of the moving bracket 22 is slidable in a telescoping manner outward through open ends 49 of the slots 41. The supports 14 and 15 are received over and held on the posts 46 and 47, respectively, by adhesive or fastening devices 26. Optionally, posts 46 and 47 may be any shape, and integral or removable from their respective brackets. Optionally, supports 14 and 15 need not be mounted thereon.

Figure 3:
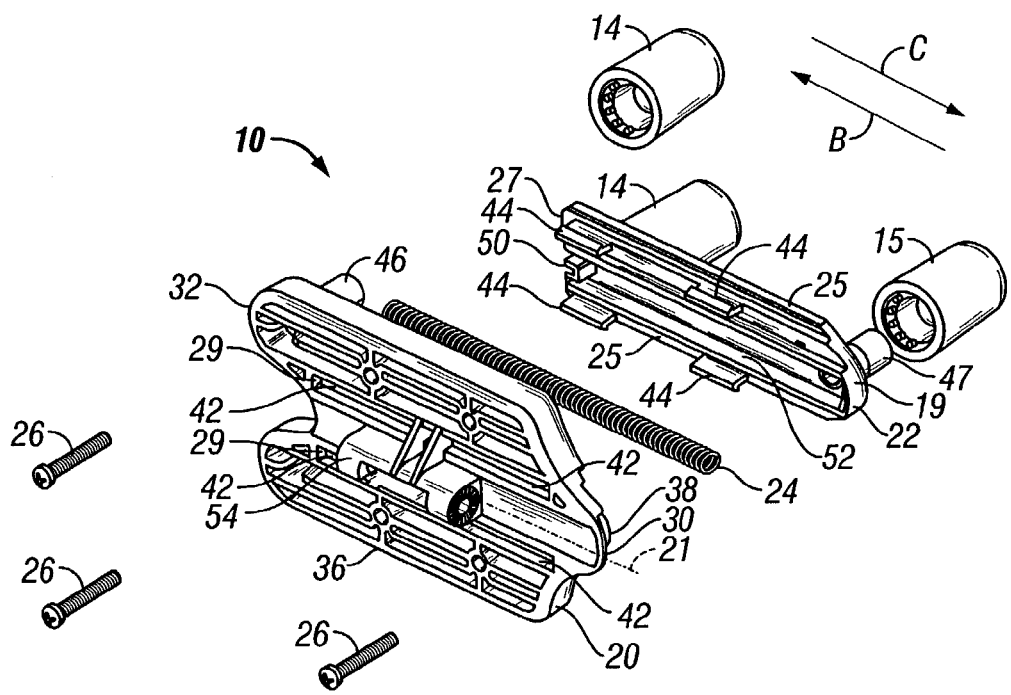
FIG. 3 is a rearward exploded view of the mounting apparatus of FIG. 1.

FIG. 3 is an exploded rear view of mounting apparatus 10 to better illustrate the clipping members 44 extending from the back surface 25 of moving bracket 22. Clipping members 44 project through fixed bracket 20 when inserted into slots 42. A stop 50 is also formed within a channel 52 on the back surface 25 of moving bracket 22. When the mounting apparatus 10 is assembled, stop 50 engages an end of the spring 24. When moving bracket 22 is moved in the direction of arrow B, the stop 50 compresses the spring 24. When moving bracket 22 is released, spring 24 causes the moving bracket 22 to move along channel 38 (shown in FIG. 2) in the direction of arrow C until supports 14 and 15 sandwich or firmly engage a device to be held within mounting apparatus 10, or until reaching a limit of travel of the moving bracket 22 (when empty). Referring to back surface 36 of fixed bracket 20, an attachment member 54 protrudes therefrom. Attachment member 54 may be attached to attachment unit 16 (FIG. 1) through a number of attachment methods.

Figure 4:
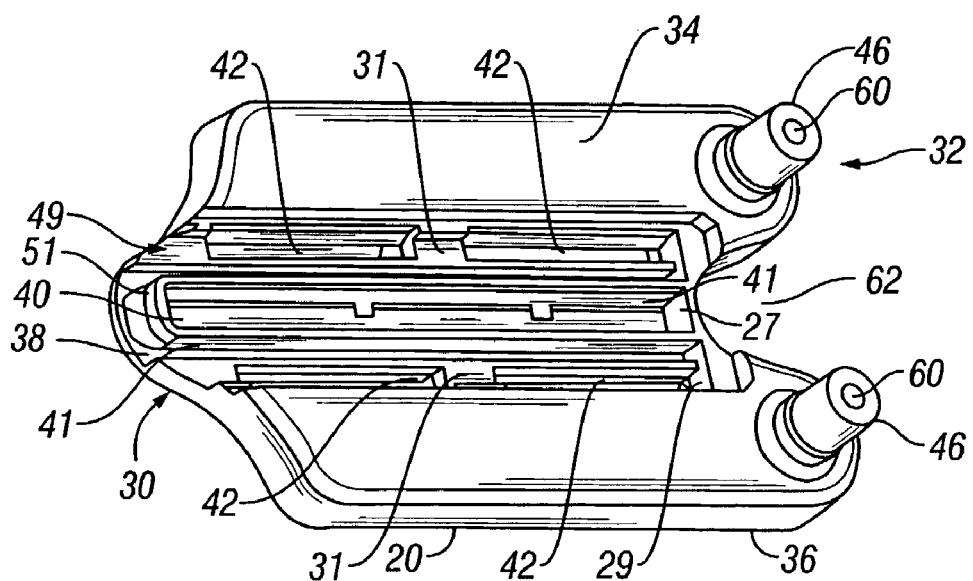
FIG. 4 is a top view of the fixed bracket of the mounting apparatus of FIG. 1.

FIG. 4 is a top view of fixed bracket 20 to better illustrate channel 38 and spring insertion channel 40 which are formed in front surface 34 and which extend from end wall 51 near second end 30 and open ends 49 to closed end 27 near first end 30. The slots 42 are formed within and extend through fixed bracket 20 and receive clipping members 44 (shown in FIG. 3). The slots 42 are substantially longer than clipping members 44 of moving bracket 20 (shown in FIG. 2) which allows the moving bracket 22 to move once inserted into channel 38 of fixed bracket 20. Posts 46 extending from front surface 34 of fixed bracket 20 are also illustrated. Holes 60 extend through posts 46. Fastening members 26 are inserted through holes 60 from back surface 36, through posts 46, and into supports 14 (shown in FIG. 3).

In one embodiment, second end 32 of fixed bracket 20 is formed with an indented area 62 between posts 46. Indented area 62 provides simple access to actuation lever 18 (shown in FIG. 1) to allow either movement or "locking" of mounting apparatus 10.

Figure 5:
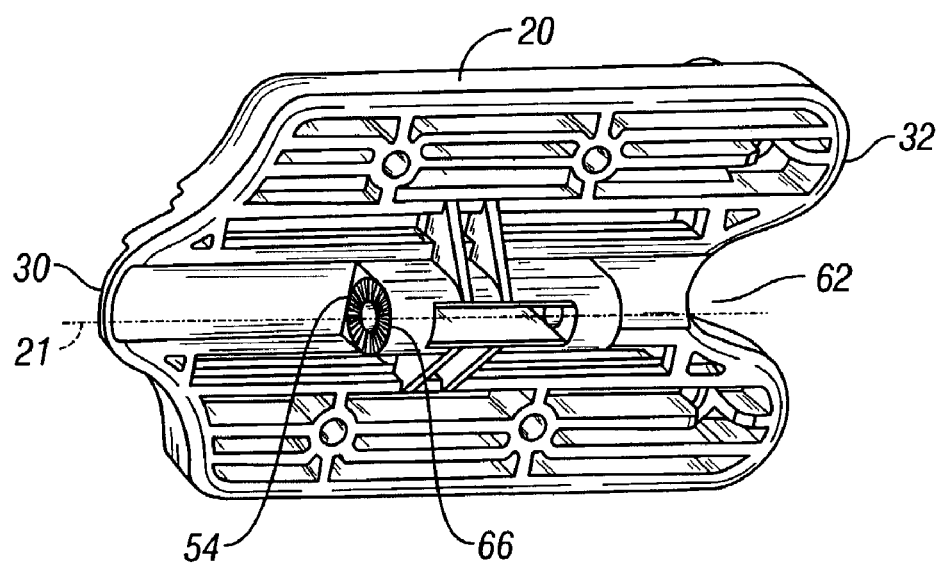
FIG. 5 is a bottom view of the fixed bracket of the mounting apparatus of FIG. 1.

FIG. 5 is a bottom view of fixed bracket 20 of mounting apparatus 10 to show attachment member 54 which is formed on, and protrudes from back surface 36. Attachment member 54 includes a plurality of teeth 66 formed on an end thereof. Teeth 66 are utilized to mate with matching teeth found on devices (not shown) which are to be attached to fixed bracket 20, to help prevent rotation. By loosening the linkage between attachment member 54 and the device attached to fixed bracket 20, teeth 66 disengage, and fixed bracket 20 can be rotated along axis 21 which extends through attachment member 54.

Figure 6:
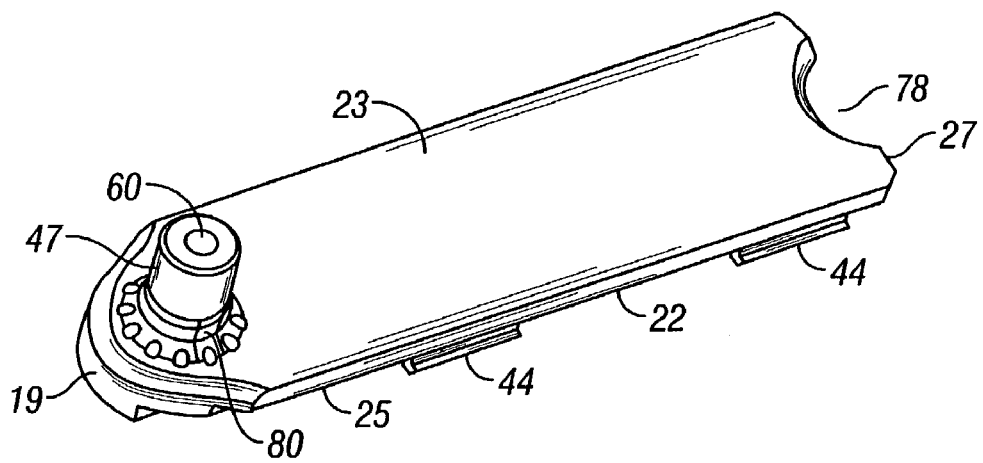
FIG. 6 is a top view of the moving bracket of the mounting apparatus of FIG. 1.

FIG. 6 illustrates the moving bracket 22 in more detail. Moving bracket 22 includes an rear end 27, a lead end 19, a front surface 23, and a back 25. As has been described above, rear end 27 of moving bracket 22 engages fixed bracket 20 (shown in FIGS. 4 and 5). In one embodiment, rear end 27 is formed with an indented area 78 which aligns with indented area 62 of fixed bracket 20 when mounting apparatus is not holding a PDA 12 (shown in FIG. 1) or similar device. Post 47 also includes a hole 60 for insertion of a fastening device 26 as described above with respect to fixed bracket 20. Post 47 is substantially round, however, and as best illustrated in FIG. 6, one embodiment of post 47 includes a flat surface 80. Flat surface 80, along with a similarly shaped area in supports 15 (shown in FIG. 8), provide a keying arrangement which helps to prevent rotation of support 15. In certain applications, the single support 15 mounted on moving bracket 22 will engage the PDA along a side which includes a greater number of switches and data card slots so as to prevent inference to the access of the switches and data card slots.

Figure 7:
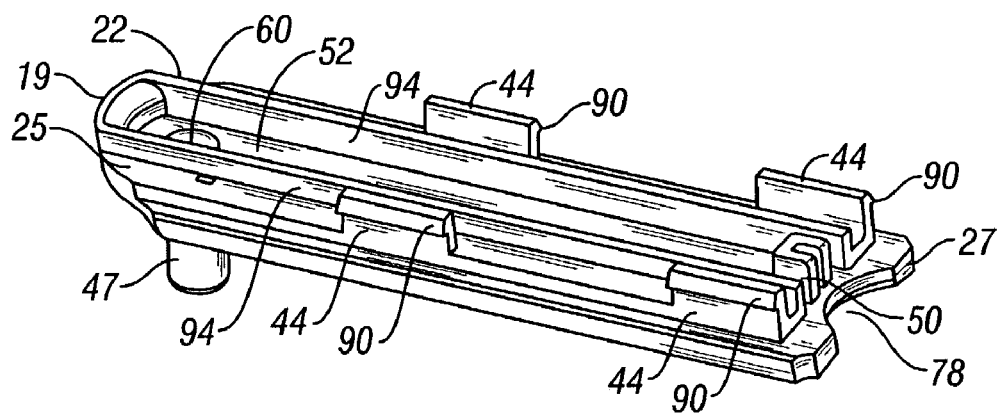
FIG. 7 is a bottom view of the moving bracket of the mounting apparatus of FIG. 1.

FIG. 7 is a bottom view of moving bracket 22 of mounting apparatus 10. As shown in FIG. 7, clipping members 44 also include protrusions 90 which provide for the above described snap fit into slots 42 (shown in FIG. 4) of fixed bracket 20. Back surface 25 of moving bracket 22 also includes channel 52 formed by substantially parallel walls 94. When mounting apparatus 10 is assembled, walls 94 are positioned adjacent to walls 41 of spring insertion channel 40 thereby surrounding spring 24 (shown in FIG. 2) on all four sides. In addition to providing a surface to engage an end of spring 24, stop 50 at least partially limits a travel of moving bracket 22 with respect to fixed bracket 20. As moving bracket 22 slides into fixed bracket 20, based on a pressure applied by spring 24, stop 50 will engage an end of spring insertion channel 40 (shown in FIG. 4) causing the spring 24 induced motion of moving bracket 22 to stop, at least when a PDA is not installed. It is also contemplated that a mounting apparatus 10 may employ more than one moving bracket 22, based on alternate configurations of the fixed bracket 20 (e.g. fixed bracket has multiple channels 38 for mounting of moving brackets 22.

Figure 8:
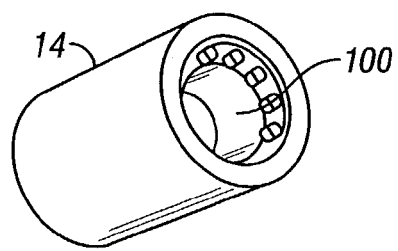
FIG. 8 is a view illustrating one embodiment of the support utilized in the mounting apparatus of FIG. 1.

FIG. 8 illustrates the embodiment of supports 14 and 15 utilized in mounting apparatus 10. The support 14 is formed with an orifice 100 which mates with posts 46 in a snug fit arrangement. Optionally, the orifice 100 may be formed with a keying arrangement therein which helps prevent rotation of support 14 on post 46. Optionally, the supports 14 may utilize a thermoplastic polymer which grips an inserted PDA or other device firmly, while absorbing unwanted shock and vibration. Optionally, one or more of supports 14 incorporate an off-centered (eccentric) mounting hole to allow an even greater grip range. The eccentric support is spring loaded which allows a lift, turn, and snap back adjustment. The above descriptions and embodiments of support 14 are also applicable to support 15 (shown in FIG. 1).

In the exemplary embodiment, two supports 14 and one support 15 are utilized, two supports 14 extending from front 34 of fixed bracket 20 substantially near second end 32 and one support 15 extending from front surface 23 of moving bracket 22 substantially near lead end 19. Spring 24, in conjunction with supports 14, fixed bracket, 20 and moving bracket 22, cause a device (e.g. PDA) to be retained by mounting apparatus 10. In the exemplary embodiment, utilization of two supports 14 and one support 15 provide three gripping points which allows for the gripping of unusually shaped objects. Supports 14 and 15 are circular, which therefore provides a single point of contact between each support and PDA 12 (shown in FIG. 1), which is tangential to a perimeter of supports 14. Other shapes for supports 14 and 15 are also contemplated.

Figure 9:
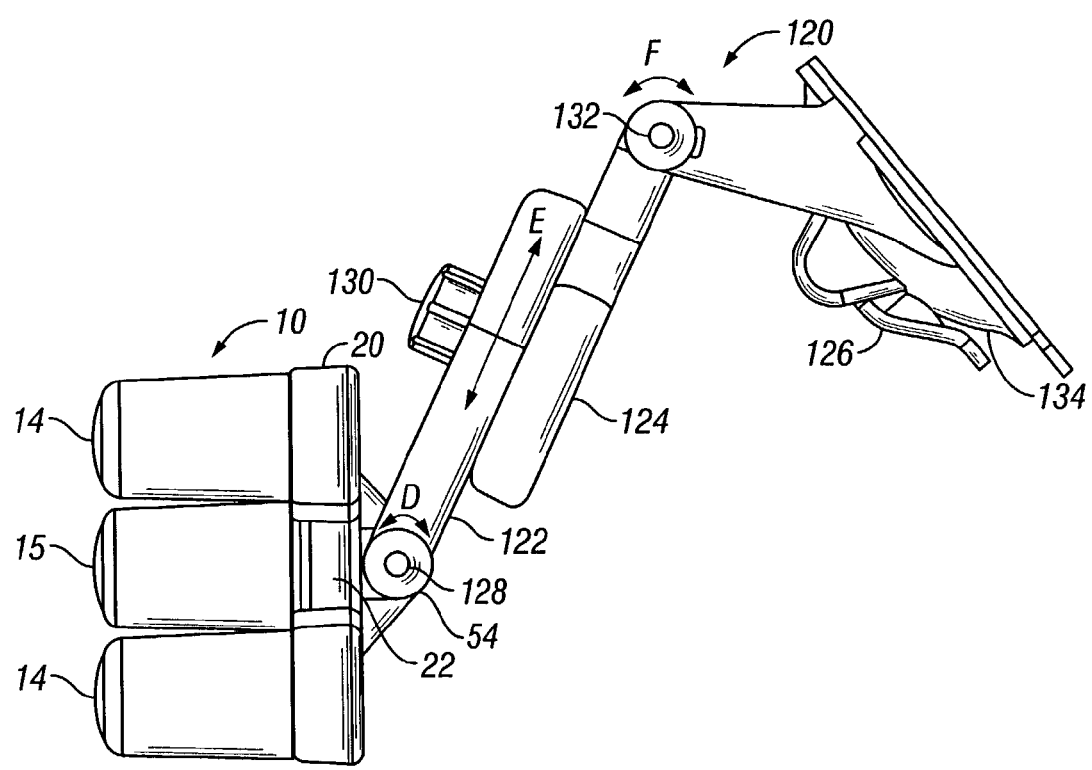
FIG. 9 is a side view of a retaining unit which utilizes the mounting apparatus of FIG. 1.

FIG. 9 is a side view of a retaining unit 120 which utilizes mounting apparatus 10. Retaining unit 120 includes mounting apparatus 10, a pivoting member 122, a swiveling member 124, and a suction unit 126. Pivoting member 122 is attached to mounting apparatus 10 at attachment member 54 (also shown in FIG. 5 and is movable around an axis of motion D. Although not shown, pivoting member 122 may be formed with teeth (not shown) which mate with teeth 66 (shown in FIG. 5) of attachment member 54 to help to prevent rotation mounting apparatus 10 with respect to pivoting member 122. A fastener 128 (e.g. screw and nut) is utilized to tighten pivoting member 122 to attachment member 54 to ensure the aforementioned teeth mesh to help prevent the rotation.

Pivoting member 122 and swiveling member 124 are attached to one another with a screw 130. When screw 130 is loosened, pivoting member 122 and swiveling member 124 are rotatably coupled to one another about the axis of motion E. However, when screw 130 is tightened, teeth (not shown) which are formed on both pivoting member 122 and swiveling member 124 engage one another in a fashion similar to that described above with respect to pivoting member 122 and attachment member 54.

Swiveling member 124 and suction unit 126 are also attached to one another in a fashion similar to that described above with respect to pivoting member 122 and attachment member 54. Further, swiveling member 124 and suction unit 126 may pivot with respect to one another about an axis of motion F, and are attached to one another with fastener 132. Suction unit 126 is any type of unit that utilizes a suction cup 134 to attach itself to a surface (i.e. windshield, dashboard, desk, table). Although not shown in the Figures, suction unit 126 may be replaced by other units that provide attachment to a surface, for example, a weighted unit or an adhesive backed device which does not utilize a suction cup. Such weighted units, adhesive backed units and suction devices are collectively referred to as base units.

While mounting apparatus 10 is shown as being a part of retaining unit 120, it is contemplated that mounting apparatus 10 is a holder that can be utilized with any number of pivoting and rotating members that provide for attachment to attachment member 54. The pivoting and rotating members allow nearly unlimited adjustability of mounting apparatus 10 when utilized with a suction unit with a suction cup (e.g. for windshield attachment), a weighted unit (e.g. for dashboard attachment), or an adhesive backed device. Optionally retaining could incorporate components which also provide for an up and down translation of mounting apparatus 10. Mounting apparatus 10, together with pivoting and rotating members and one of the suction unit, adhesive backed device, and weighted unit provide a retaining unit for PDAs or other similarly sized devices that allows both easy access to the device and easy one-handed insertion and removal of a PDA from the mounting apparatus.

Optionally, the spring 24 may be replaced with a clamping element. Optionally, the spring 24 may be provided in front, behind, above or below the fixed and moving brackets 20 and 22.

While the invention has been described in terms of various specific embodiments, those skilled in the art will recognize that the invention can be practiced with modification within the spirit and scope of the claims.

What is claimed is:

1. An apparatus for holding an electronic device, comprising:
   first and second brackets slidably joined with one another and moveable to expand away from, and contract toward, one another along an operating path;
   first and second braces provided on said first and second brackets, respectively, and spaced apart from one another to define a retention area therebetween, said first bracket including a laterally aligned channel traversing said retention area, said second bracket telescopically sliding in said channel, wherein said first bracket comprises—
   an indented area proximate said first brace, and
   an attachment member protruding from a back surface of said first bracket, said indented area providing an access to a retaining unit which engages said attachment member; and
   a biasing element biasing said first and second brackets toward one another, said first and second braces being configured to grasp an electronic device therebetween.

2. The apparatus of claim 1, wherein said first and second braces and front surfaces of said first and second brackets define said retention area having an open face and having at least one of exposed top, bottom and side borders.

3. The apparatus of claim 1, wherein said second bracket snaps into said channel.

4. The apparatus of claim 1, wherein said second bracket includes a clipping member that snaps into a slot formed in said channel in said first bracket.

5. The apparatus of claim 1, wherein said channel in said first bracket comprises a slot formed therein, said slot extending through said first bracket and running between said first and second braces, said second bracket comprising a clipping member extending from a back portion of said second bracket, said clipping member extending through said slot when snapped onto said first bracket.

6. The apparatus of claim 1, wherein said second bracket comprises:
   a stop formed within said channel, said stop engaging said biasing element when said second bracket is attached to said first bracket.

7. The apparatus of claim 1, wherein said first and second brackets comprise mounting posts extending from front surfaces.

8. A retaining unit comprising a mounting apparatus, a pivoting member pivotably attached to said mounting apparatus, a swiveling member rotatably coupled to said pivoting member, and a base unit pivotably coupled to said swiveling member, said mounting apparatus comprising:
   first and second brackets slidably joined with one another and moveable to expand away from, and contract toward, one another along an operating axis;
   first and second braces provided on said first and second brackets, respectively, and spaced apart from one another to define a retention area therebetween, said first and second braces being staggered relative to one another along opposite sides of said retention area to provide open side areas opposite each of said first and second braces across said retention area, wherein said first brace is attached to said first bracket via a screw inserted from a back side and extending through a front side of said first bracket; and
   a biasing element biasing said first and second brackets toward one another, said first and second braces being configured to grasp an electronic device therebetween.

9. The retaining unit of claim 8, wherein said first and second braces and front surfaces of said first and second brackets define an open faced retention area having at least one of exposed top, bottom and side borders.

10. The retaining unit of claim 8, wherein said first bracket includes a laterally aligned channel, said second bracket being slidable within said channel, said first brace being offset from said channel, said second brace being aligned along a central axis of said channel.

11. The retaining unit of claim 8, wherein said second bracket is snapped onto said first bracket in a recessed relationship therebetween to provide a substantially smooth front surface across both of said first and second brackets.

12. The retaining unit of claim 8, wherein at least one of said first and second braces include a post extending outward from a front surface of a corresponding one of said first and second brackets.

13. The retaining unit of claim 8, wherein said first bracket comprises a slot formed therein, said slot extending through said first bracket and running between said first and second braces, said second bracket comprising a clipping member extending from a back portion of said second bracket, said dipping member engaging said first bracket when inserted through said slot.

14. The retaining unit of claim 8, wherein said first and second brackets comprise mounting posts extending from front surfaces.

15. A holder for a portable device, comprising:
   a base having a front surface defining a retention area configured to receive a device, said retention area having an open front face to facilitate insertion of the portable device, said base includes a laterally aligned channel;
   an arm movably attached to said base, said arm moving along an axis of motion relative to said base, said axis of motion extending through said retention area, said arm being telescopically slidable within said channel;

gripping members comprising a first pair of gripping members fixedly secured on one of said base and arm and comprising a second gripping member provided on another of said base and arm, said first pair of gripping members and said second gripping member being spaced apart from one another in a staggered pattern to define side borders of said retention area; and a single spring member biasing all of said gripping members toward one another along said axis of motion.

16. The holder of claim 15, wherein said base is configured to receive the portable device in a vertical alignment, said gripping members engaging opposite side of the portable device.

17. The holder of claim 15, wherein said base includes open upper and lower ends to permit the portable device to extend beyond said base.

18. The holder of claim 15, wherein said retention area defines an upright axis along which a device is oriented when held in said base, said axis of motion being oriented transverse to said upright axis such that said gripping members engage opposite sides of the portable device.

19. The holder of claim 15, wherein said gripping members are arranged in a staggered pattern along opposite sides of said retention area.

20. The holder of claim 15, wherein said gripping members are configured to hold at least one of a cellular telephone and a personal digital assistant.

21. The holder of claim 15, further comprising means for mounting said base.

22. The holder of claim 15, further comprising means for pivotably and rotatably mounting said base to at least one of a dashboard, a window, a table, and a desk.

23. The holder of claim 15, further comprising:
means for mounting said base to a support structure; and
means for enabling at least one of pivoted, rotational, and translational motion of said base relative to the support structure.

24. An apparatus for holding an electronic device, comprising:
first and second brackets slidably joined with one another and moveable to expand away from, and contract toward, one another along an operating path;
first and second braces provided on said first and second brackets, respectively, and spaced apart from one another to define a retention area therebetween, said first bracket including a laterally aligned channel traversing said retention area, said second bracket telescopically sliding in said channel, wherein said first bracket comprises—
an indented area proximate said first brace, and
an attachment member protruding from a back surface of said first bracket, said indented area providing an access to a retaining unit which engages said attachment member; and
a biasing element biasing said first and second brackets toward one another, said first and second braces being configured to grasp an electronic device therebetween, wherein said biasing element includes at least one of a spring, a clamp and an elastic material.

25. An apparatus for holding an electronic device, comprising:
first and second brackets slidably joined with one another and moveable to expand away from, and contract toward, one another along an operating path;
first and second braces provided on said first and second brackets, respectively, and spaced apart from one another to define a retention area therebetween, said first bracket including a laterally aligned channel traversing said retention area, said second bracket telescopically sliding in said channel, wherein said first bracket comprises—
an indented area proximate said first brace, and
an attachment member protruding from a back surface of said first bracket, said indented area providing an access to a retaining unit which engages said attachment member; and
a biasing element biasing said first and second brackets toward one another, said first and second braces being configured to grasp an electronic device therebetween, wherein said first brace includes a first pair of braces proximate one side of said retention area, said second brace being located proximate an opposite side of said retention area, said first pair of braces and said second brace being arranged in a staggered pattern.

26. An apparatus for holding an electronic device, comprising:
first and second brackets slidably joined with one another and moveable to expand away from, and contract toward, one another along an operating path;
first and second braces provided on said first and second brackets, respectively, and spaced apart from one another to define a retention area therebetween, said first bracket including a laterally aligned channel traversing said retention area, said second bracket telescopically sliding in said channel, wherein said first bracket comprises—
an indented area proximate said first brace, and
attachment member protruding from a back surface of said first bracket, said indented area providing an access to a retaining unit which engages said attachment member; and
a biasing element biasing said first and second brackets toward one another, said first and second braces being configured to grasp an electronic device therebetween, wherein said first brace includes a first pair of braces attached to one end of said first bracket, said channel being located between said first pair of braces.

27. An apparatus for holding an electronic device, comprising:
first and second brackets slidably joined with one another and moveable to expand away from, and contract toward, one another along an operating path;
first and second braces provided on said first and second brackets, respectively, and spaced apart from one another along said operating path; and
a biasing element biasing said first and second brackets toward one another, said first and second braces being configured to grasp an electronic device therebetween, said first and second brackets comprising mounting posts extending from front surfaces for mounting said first and second braces, said mounting posts and said first and second braces comprising a keying arrangement to prevent said first and second braces from rotating when mounted on said mounting posts.

28. An apparatus for holding an electronic device, comprising:
first and second brackets slidably joined with one another and moveable to expand away from, and contract toward, one another along an operating path;
first and second braces provided on said first and second brackets, respectively, and spaced apart from one another along said operating path; and
a biasing element biasing said first and second brackets toward one another, said first and second braces being configured to grasp an electronic device therebetween, said braces comprising an off-center mounting hole and a spring, said braces providing a lift, turn, and snap back adjustment of said braces.

29. A retaining unit comprising a mounting apparatus, a pivoting member pivotably attached to said mounting apparatus, a swiveling member rotatably coupled to said pivoting member, and a base unit pivotably coupled to said swiveling member, said mounting apparatus comprising:
   first and second brackets slidably joined with one another and moveable to expand away from, and contract toward, one another along an operating axis;
   first and second braces provided on said first and second brackets, respectively, and spaced apart from one another to define a retention area therebetween, said first and second braces being staggered relative to one another along opposite sides of said retention area, wherein said first brace is attached to said first bracket via a screw inserted from a back side and extending through a front side of said first bracket; and
   a biasing element biasing said first and second brackets toward one another, wherein said biasing element includes at least one of a spring, a clamp and an elastic material.

30. A retaining unit comprising a mounting apparatus, said mounting apparatus comprising:
   first and second brackets slidably joined with one another and moveable to expand away from, and contract toward, one another along an operating axis;
   first and second braces provided on said first and second brackets, respectively, and spaced apart from one another to define a retention area therebetween, said first and second braces being staggered relative to one another along opposite sides of said retention area, wherein said first brace is attached to said first bracket via a screw inserted from a back side and extending through a front side of said first bracket; and
   a biasing element biasing said first and second brackets toward one another, wherein said first bracket comprises:
      an indented area proximate said first brace; and
      an attachment member protruding from a back surface of said first bracket, said indented area providing an access to a retaining unit which engages said attachment member.

31. A retaining unit comprising a mounting apparatus, a pivoting member pivotably attached to said mounting apparatus, a swiveling member rotatably coupled to said pivoting member, and a base unit pivotably coupled to said swiveling member, said mounting apparatus comprising:
   first and second brackets slidably joined with one another and moveable to expand away from, and contract toward, one another along an operating axis;
   first and second braces provided on said first and second brackets, respectively, and spaced apart from one another to define a retention area therebetween, said first and second braces being staggered relative to one another along opposite sides of said retention area, wherein said first brace is attached to said first bracket via a screw inserted from a back side and extending through a front side of said first bracket; and
   a biasing element biasing said first and second brackets toward one another, wherein said second bracket comprises:
      a channel formed therein and running lengthwise between said first and second braces; and
      a stop formed within said channel, said stop engaging said biasing element when said second bracket is attached to said first bracket.

32. A retaining unit comprising a mounting apparatus, said mounting apparatus comprising:
   first and second brackets slidably joined with one another and moveable to expand away from, and contract toward, one another along an operating axis;
   first and second braces provided on said first and second brackets, respectively, and spaced apart from one another to define a retention area therebetween, said first and second braces being staggered relative to one another along opposite sides of said retention area; and
   a biasing element biasing said first and second brackets toward one another, wherein said first and second brackets comprise mounting posts extending from front surfaces for mounting said first and second braces, said mounting posts and said first and second braces comprising a keying arrangement to prevent said first and second braces from rotating when mounted on said mounting posts.

33. A retaining unit comprising a mounting apparatus, said mounting apparatus comprising:
   first and second brackets slidably joined with one another and moveable to expand away from, and contract toward, one another along an operating axis;
   first and second braces provided on said first and second brackets, respectively, and spaced apart from one another to define a retention area therebetween; and
   a biasing element biasing said first and second brackets toward one another, wherein said braces comprise an off-center mounting hole and a spring, said braces providing a lift, turn, and snap back adjustment of said braces.

* * * * *